United States Patent [19]

Meeker

[11] 4,186,962
[45] Feb. 5, 1980

[54] CAR SEAT SUPPORT AND RESTRAINING STAND

[76] Inventor: Paul K. Meeker, 412 Park Ave., Kent, Ohio 44240

[21] Appl. No.: 863,308

[22] Filed: Dec. 22, 1977

[51] Int. Cl.² .......................... A47C 1/08; A62B 35/00
[52] U.S. Cl. ...................... 297/250; 297/216; 297/377; 297/467; 297/484
[58] Field of Search ............... 297/250, 216, 390, 385, 297/377

[56] References Cited

U.S. PATENT DOCUMENTS

| 3,528,701 | 9/1970 | Laughlin | 297/377 X |
| 3,858,936 | 1/1975 | Gerkin | 297/377 |
| 3,948,556 | 4/1976 | Hyde et al. | 297/250 |
| 3,976,328 | 8/1976 | Stahel | 297/377 |
| 3,992,056 | 11/1976 | Koziatek | 297/250 |
| 3,992,056 | 11/1976 | Koziatek | 297/250 |

FOREIGN PATENT DOCUMENTS

| 755904 | 4/1967 | Canada | 297/377 |
| 1316684 | 12/1962 | France | 297/377 |

Primary Examiner—James T. McCall

[57] ABSTRACT

A rigid support and restraining stand for an infant car seat having opposed legs pivotally mounted to the seat. A bight member is connected to the opposed legs by associated rod members. The rod members and legs form an acute angle whereby the bight member firmly grasps the front edge of the auto seat when the infant car seat is in a rearward facing position.

8 Claims, 5 Drawing Figures

CAR SEAT SUPPORT AND RESTRAINING STAND

This application relates generally to car seats and more specifically to a support and restraining stand for an infant car seat which is also specifically usable for restraining purposes when the car seat is in the rearwardly facing direction.

Many types of infant seats are available at the present time which may be used as a reclining seat and which may also be used in either a forward or a rearward facing direction when it is used in an automobile. One such type of seat is disclosed in U.S. Pat. No. 3,992,056 issued Nov. 16, 1976 and assigned to the assignee of the present invention. This patent discloses a molded infant car seat which is used in conjunction with the auto lap belt and which may be used in either a forward facing or a rearward facing direction. As disclosed therein, when used in a rearwardly facing direction, the auto lap belt retains the seat firmly against the seat portion of the automobile seat.

One of the problems involved with this type of seat is the fact that, if there is a rearward impact against the automobile, the seat will have a tendency to pivot about the point where it is held by the auto lap belt, thus bringing the infant into contact with the back portion of the automobile seat.

Accordingly, it is an object of the present invention to provide a support and restraining stand for an infant car seat which may also be used as a restraining structure when the infant is in the rearward facing direction.

It is to be noted that the reclining and restraining support stand of the present invention may be used with any infant car seat which is capable of being placed in a rearward facing direction while being held in position by the auto lap belt. Accordingly, although the invention is illustrated as used with the seat of the above-identified patent, the invention is not to be restricted to use with that particular seat. In the following description, general references are made to the seat itself and any particulars may be determined by reference to the above-identified patent.

BRIEF DESCRIPTION OF THE DRAWINGS

The invention will be more clearly understood from the following description taken in conjunction with the drawings wherein.

BRIEF SUMMARY OF THE INVENTION

The present invention comprises a rigid support and restraining stand for an infant car seat having opposed legs pivotally mounted to the seat. A bight member is connected to the opposed legs by associated rod members. The rod members and legs form an acute angle whereby the bight member firmly grasps the front edge of the auto seat when the infant car seat is in a rearward facing position.

DETAILED DESCRIPTION OF A PREFERRED EMBODIMENT OF THE INVENTION

Figure 1:
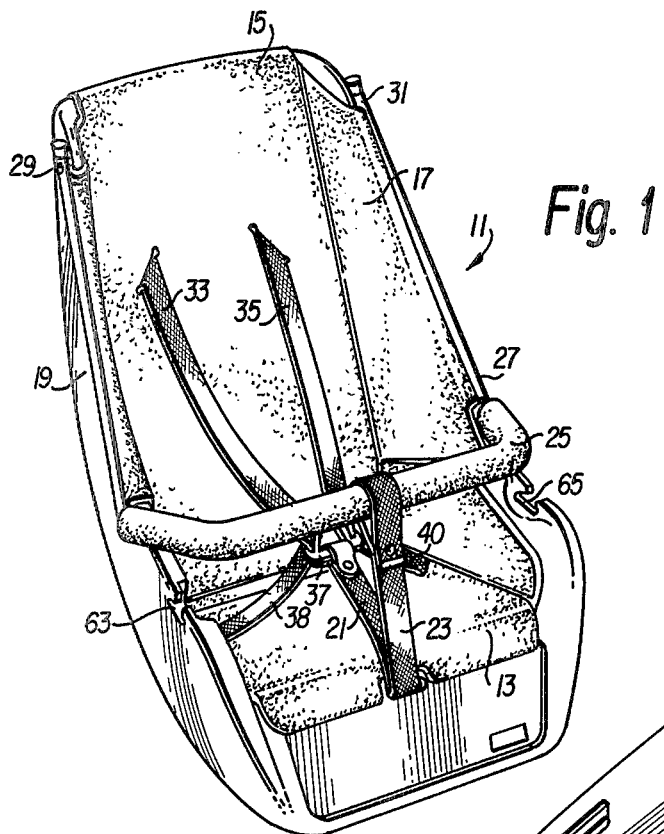
FIG. 1 is a perspective view of one type of seat with which the invention can be used.

Turning now more specifically to the drawings, there is shown in FIG. 1 an integral car seat 11 having a seat portion 13 and a back portion 15 together with side panels 17 and 19.

A standard type of crotch strap 21 also serves as an arm rest retainer by snapping around the padded arm rest 25. The padded arm rest 25 is mounted on a U-shaped bar member 27 which is pivoted to the sides of the seat at 29 and 31.

A further strap is used to provide shoulder harnesses 33 and 35 and seat straps 38 and 40. This strap is mated with the crotch strap by means of a clasp 37. The shoulder harnesses 33 and 35 pass through slots 58 (FIG. 2) in the back of the car seat. This is a standard type of an arrangement and is described more thoroughly in the above-identified patent.

Figure 2:
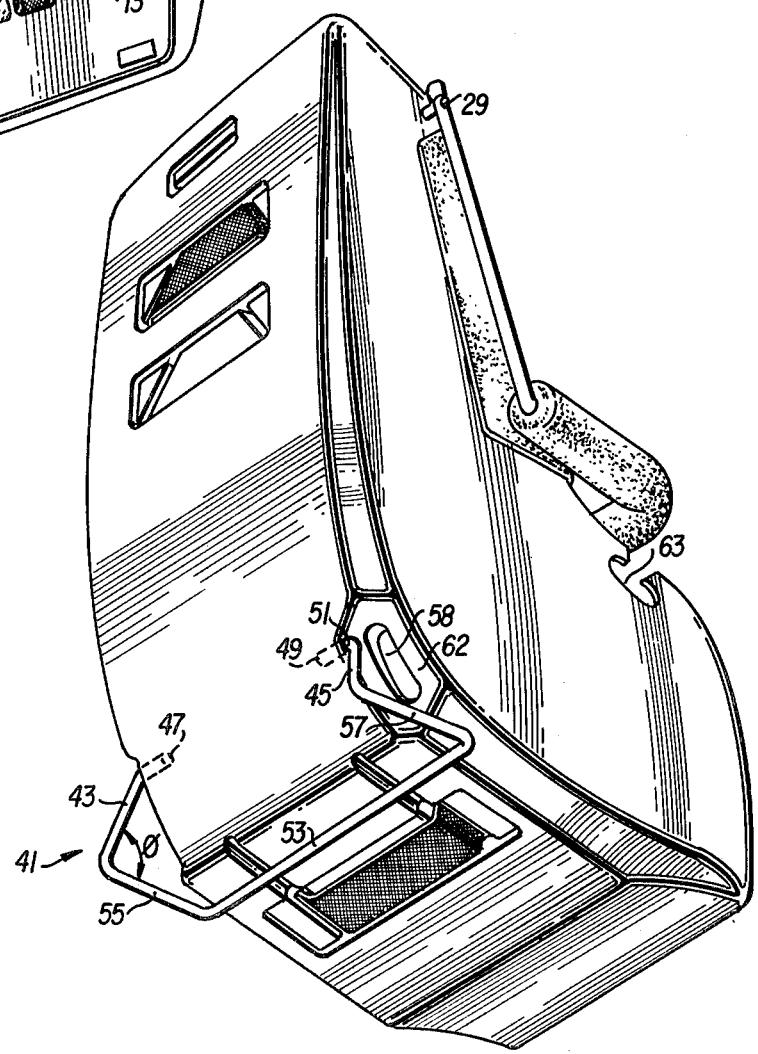
FIG. 2 is a perspective view of the rear part of the seat of FIG. 1.

FIG. 2 discloses the basic support and restraining stand 41. Stand 41 is comprised of opposed legs 43 and 45 which terminate at their upper end in substantially right angle bends 47 and 49. The sections 47 and 49 are inserted in apertures 51 in the seat itself and are rotatable therein. The opposed legs, together with the bight 53 and the intermediate rod sections 55 and 57 comprise, in effect, a U-shaped member which forms the basic stand and restrainer of the present invention.

Figure 3:
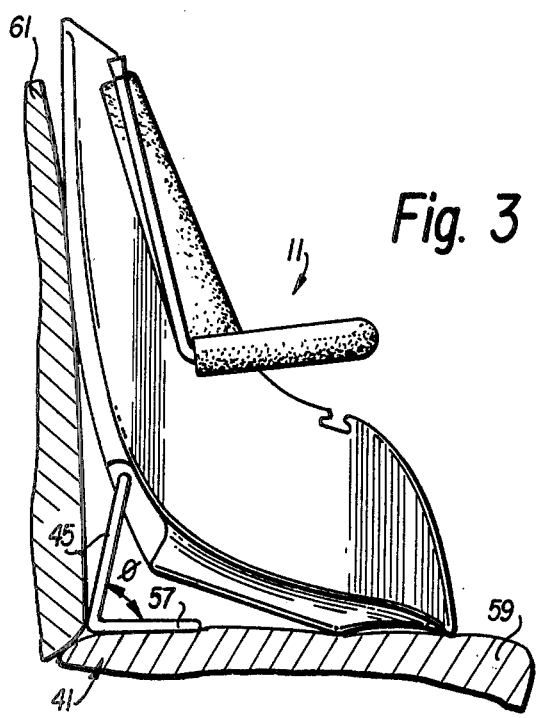
FIG. 3 is a side elevational view showing the seat and stand in position facing forward in an automobile.
Figure 4:
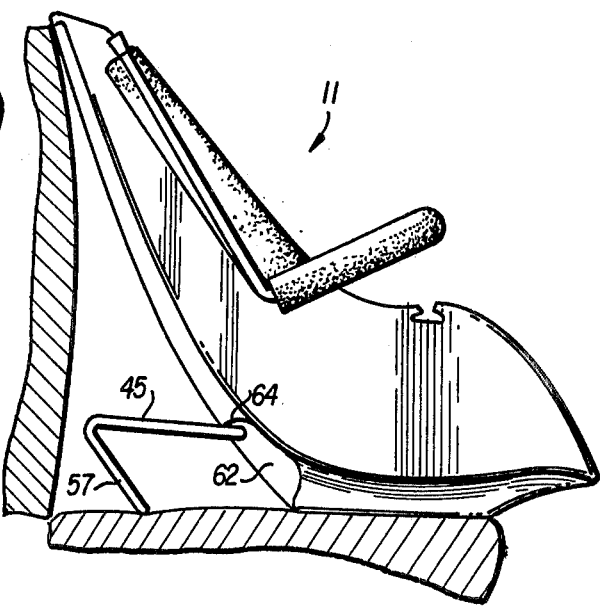
FIG. 4 is a view similar to FIG. 3 showing the seat in a reclining forward facing position.

As can be seen more clearly in FIGS. 3 and 4, the rod members 55 and 57 and the opposed legs 43 and 45 meet to form an acute angle $\phi$. For purposes which will become evident as the description proceeds, this angle $\phi$ is substantially less than 90° but greater than 50° and, preferably an angle of approximately 60°.

Turning now to FIG. 3, seat 11 is shown in an upright forward facing position resting on the seat 59 and against the rear 61 of the seat of an automobile. The support structure 41 is shown in a forward position wherein the bight 53 is resting against the underside of the seat. This places the seat in a sitting position for the infant.

FIG. 4 shows the seat 11 in a reclining position while the seat is still in a forward facing direction. It is to be noted that on the lower rearward edge of the seat there are channels 62 on either side thereof. These channels have an upper termination 64 which provide stops for the opposed legs 43 and 45 to limit the reclining position of the seat to the position as shown in FIG. 4.

Figure 5:
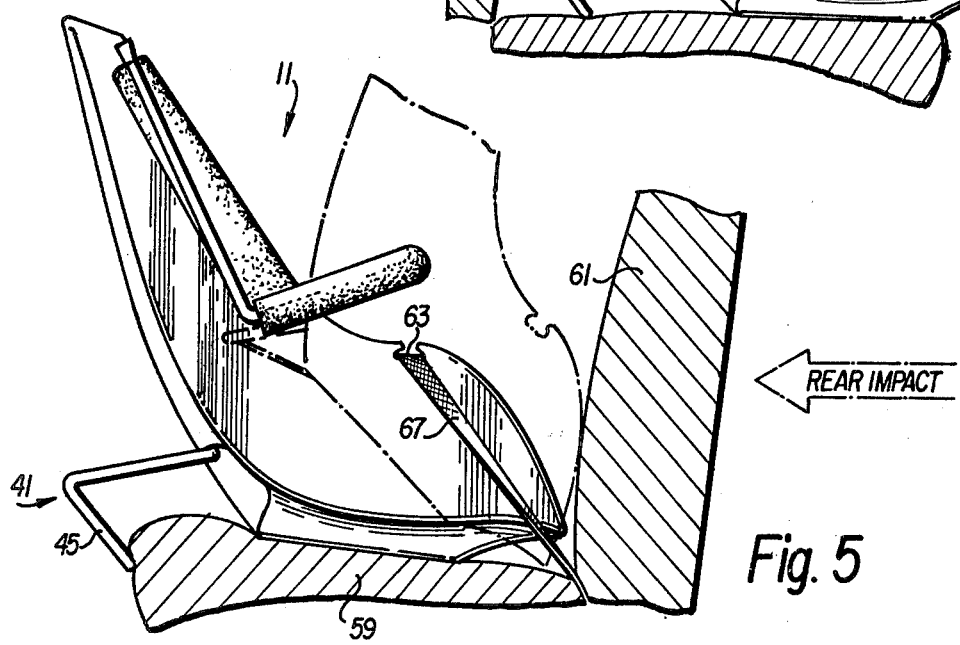
FIG. 5 is a side elevation showing a seat and a stand as used in a rearward facing position.

FIG. 5 illustrates the use of the seat in the rearward facing direction of the same automobile seat as shown in FIGS. 3 and 4. In this position, the stand 41 is in substantially the same position as that shown in FIG. 4 at the upper limit of its movement. As can be seen, the legs 43 and 45 are hooked over the seat portion 59 of the car seat and allow the seat to be grasped firmly by the bight 53. There is shown also the auto seat belt 67 in place through the slots 63 and 65. The dotted arrow indicates the force of a rear impact on an automobile. When this occurs, with the use of the present restraint support stand 41, the seat will remain in substantially the same position as shown by the solid lines of FIG. 5. However, in a seat which does not have the restraining stand of the present invention, the rearward impact force would cause the seat to rotate forwardly as indicated by the dotted lines. The results of such a rotative force are obvious.

In order for the stand to properly grasp the seat and not slip therefrom, the angle $\phi$ must be acute. A ninety degree angle or an obtuse angle would not assure that the stand would remain in place upon impact. Likewise, an acute angle which is too extreme would not permit the stand to properly grasp the seat.

As will now be evident, the present invention has provided an additional safety measure which improves the overall use and safety aspects of an infant car seat. Since this invention may be used with car seats other than shown and described above, the invention is to be limited only by the scope of the following claims.

I claim:

1. In an infant car seat having a back, seat and sides, a rigid support and restraining stand comprising
   opposed legs;
   means for pivotally mounting said opposed legs to said car seat;
   a bight member; and
   opposed rod members connecting said bight member to the outer ends of said opposed legs, each of said rod members forming an acute angle with said associated opposed leg, said opposed rod members being of a length to allow the bight member to grasp the outer portion of the car seat when said infant seat faces in a rearward direction;
   said opposed legs and bight member being of a length and geometrical configuration such that said bight member may be pivoted so as to rest against the underside of said seat while supporting said seat.

2. The car seat of claim 1 wherein said support and restraining stand is a unitary structure.

3. The car seat of claim 1 wherein said means for pivotally mounting said opposed legs to said car seat comprises
   a substantially right angle bend at each of the ends of said legs opposite said rod members; and
   apertures in said seat back through which said right angle bends extend and are rotatable therein.

4. The car seat of claim 3 wherein
   said bight member is substantially parallel to said right angle bends.

5. The car seat of claim 1 further comprising stop means for limiting the pivotal movement of said rigid support stand between two fixed positions.

6. The car seat of claim 1 further comprising
   a slot in each of said sides through which an auto lap belt may pass.

7. The car seat of claim 1 wherein said acute angle is less than ninety degrees and more than fifty degrees.

8. The car seat of claim 1 wherein said acute angle is substantially sixty degrees.

* * * * *